United States Patent [19]

Okazaki et al.

[11] Patent Number: 4,800,154
[45] Date of Patent: Jan. 24, 1989

[54] SILVER HALIDE PHOTOGRAPHIC EMULSION

[75] Inventors: Masaki Okazaki; Haruo Takei, both of Kanagawa, Japan

[73] Assignee: Fuji Photo Film Co., Ltd., Kanagawa, Japan

[21] Appl. No.: 919,418

[22] Filed: Oct. 16, 1986

[30] Foreign Application Priority Data

Oct. 16, 1985 [JP] Japan .................................. 60-230826

[51] Int. Cl.$^4$ .......................... G03C 1/08; G03C 1/19; G03C 1/24
[52] U.S. Cl. .................................... 430/570; 430/580; 430/581; 430/582; 430/583; 430/584; 430/585; 430/586; 430/587; 430/588; 430/589; 430/590; 430/591; 430/592; 430/593; 430/594; 430/595; 430/598
[58] Field of Search .............. 430/570, 580–595, 430/598

[56] References Cited

U.S. PATENT DOCUMENTS 4,255,113  3/1981  Hirano et al. ................... 430/570 X
4,550,070  10/1985  Miyasaka et al. ............... 430/598 X
4,684,604  8/1987  Harder ........................... 430/544 X

FOREIGN PATENT DOCUMENTS 0153040  8/1985  Japan .................................. 430/598

Primary Examiner—Paul R. Michl
Assistant Examiner—Lee C. Wright
Attorney, Agent, or Firm—Sughrue, Mion, Zinn, Macpeak & Seas

[57] ABSTRACT

A silver halide photographic emulsion comprising at least one spectral sensitizing dye having the following general formula (I):

$$\text{Dye}-\text{J}^1-\text{CONH}-\text{J}^2-\text{NHNHG}-\text{R} \quad \text{(I)}$$

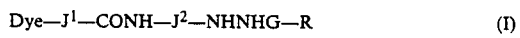

wherein Dye represents a dye residue capable of becoming a spectral sensitizing dye; $J^1$ represents a substituted or unsubstituted alkylene group, a substituted or unsubstituted arylene group, a substituted or unsubstituted aralkylene group, or a substituted or unsubstituted alkarylene group; $J^2$ represents a substituted or unsubstituted arylene group; R represents hydrogen atom, a substituted or unsubstituted alkyl group, a substituted or unsubstituted aryl group, a substituted or unsubstituted alkoxy group, or a substituted or unsubstituted aryloxy group; and G represents a carbonyl group, a sulfonyl group, a sulfoxy group, a phosphoryl group, or a substituted or unsubstituted iminomethylene group.

6 Claims, 1 Drawing Sheet

SILVER HALIDE PHOTOGRAPHIC EMULSION

FIELD OF THE INVENTION

The present invention relates to a silver halide photographic emulsion, and, more particularly, to a silver halide photographic emulsion containing a spectral sensitizing dye having a hydrazine derivative as a substituent group.

BACKGROUND OF THE INVENTION

A spectral sensitization process in silver halide photography is known as a means for extending light-sensitive wavelengths of a silver halide photographic emulsion from the intrinsic sensitivity region of silver halides toward longer wavelengths, and has served as an important technique. The sensitizable region has come to be extended to encompass infrared wavelengths, and is capable of being controlled by the skilled artisan by properly choosing sensitizing dyes having particular chemical structures so as to suit a particular need.

However, the popular demand for silver halide photographic emulsions having higher sensitivity continues to grow, and great efforts are being made by those engaged in research and development to enhance the sensitivity of emulsions. Under these circumstances, it is a natural consequence to strive for the development of novel sensitizing dyes capable of imparting higher spectral sensitivity to silver halide photographic emulsions.

One method employing sensitizing dyes to give higher sensitivity to emulsions consists of increasing light absorptivity of the emulsions, and sensitizing dyes developed in accordance with this idea are described in U.S. Pat. Nos. 3,622,317, 3,976,493 and 3,976,640. Another method consists of the exclusion of desensitization factors resulting from sensitizing dyes. As a means of carrying out this idea, supersensitization or the like is commonly performed, and many supersensitizing combinations of spectral sensitizing dyes are known. The desensitization factors mentioned above include development inhibition caused by sensitizing dyes. To counter this effect, a development accelerator often is used in conjunction with such sensitizing dyes.

In many cases, however, common spectral sensitizing dyes cannot coexist with other ingredients contained in a silver halide emulsion. Accordingly, a simple simultaneous use of a development accelerator and sensitizing dyes cannot always achieve the desired result. This inability to coexist is theorized to result from competition between sensitizing dyes and other chemical ingredients for occupying positions on the individual surfaces of silver halide grains. A general idea and compound examples proposed with the intention of eliminating this competitive phenomenon between a nucleating agent and sensitizing dyes are described in Japanese Patent Application (OPI) Nos. 9433/72 and 9678/72 (the term "OPI" as used herein means an "unexamined published application"), U.S. Pat. No. 3,718,470, and Research Disclosure No. 15162 (November 1976). However, examples which illustrate success in eliminating this competitive phenomenon are absent in the above cited literature, and no description of the attainment of spectral sensitivity higher than that obtained when using conventional sensitizing dyes is described therein.

SUMMARY OF THE INVENTION

Therefore, a first object of the present invention is to provide a novel sensitizing dye which can result in higher sensitivity than by using conventional sensitizing dyes.

A second object of the present invention is to provide a silver halide photographic emulsion containing the above-described sensitizing dye.

As a result of earnest studies aimed at attainment of the above-described objects, it has been found that remarkably superior results can be obtained by using a silver halide photographic emulsion containing a compound represented by the following general formula (I):

Dye—$J^1$—CONH—$J^2$—NHNHG—R   (I)

wherein Dye represents a dye residue capable of becoming a spectral sensitizing dye; $J^1$ represents a substituted or unsubstituted alkylene group, a substituted or unsubstituted arylene group, a substituted or unsubstituted aralkylene group, or a substituted or unsubstituted alkarylene group; $J^2$ represents a substituted or unsubstituted arylene group; R represents a hydrogen atom, a substituted or unsubstituted alkyl group, a substituted or unsubstituted aryl group, a substituted or unsubstituted alkoxy group, or a substituted or unsubstituted aryloxy group; and G represents a carbonyl group, a sulfonyl group, a sulfoxy group, a phosphoryl group, or a substituted or unsubstituted iminomethylene group.

BRIEF DESCRIPTION OF THE ACCOMPANYING DRAWINGS

FIG. 1 and FIG. 2 are the spectral sensitivity curves of the present invention, determined in Example 1. FIG. 1 corresponds to Test No. 5, and FIG. 2 corresponds to Test No. 12. FIG. 3 is also the spectral sensitivity curve of the present invention, determined in Example 2, and corresponds to Test No. 17. In these figures, the sensitivity is plotted as ordinate and the wavelength as abscissa.

DETAILED DESCRIPTION OF THE INVENTION

Figure 1:
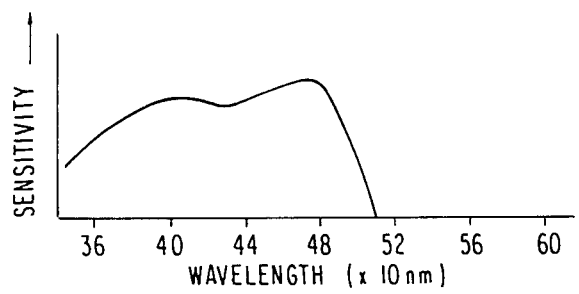

Spectral sensitizing dyes which can be utilized as a dye residue represented by Dye in the general formula (I) include a group of dyes described in F. M. Hamer, *Heterocyclic Compounds-Cyanine Dyes and Related Compounds*, John Wiley & Sons, New York, London (1964).

More specifically, these dyes include cyanine dyes, merocyanine dyes, complex cyanine dyes, complex merocyanine dyes, holopolar cyanine dyes, hemicyanine dyes, styryl dyes, and hemioxonol dyes. Of these, cyanine dyes and merocyanine dyes are most preferred.

Cyanine dyes are a group of dyes represented by the following general formula (A):

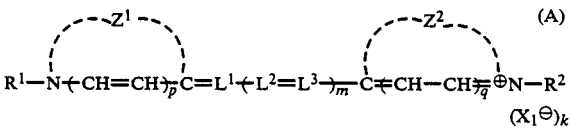

wherein $Z^1$ and $Z^2$ may be the same or different, and each represents a group of atoms necessary to constitute a 5- or 6-membered hetero ring; $R^1$ and $R^2$ may be the same or different, and each represents an unsubstituted or substituted alkyl group; $L^1$, $L^2$ and $L_3$ may be the same or different, and each represents an unsubstituted or substituted methine group; p and q each respresents 0 or 1; m represents 0, 1, 2 or 3; $X_1^\ominus$ represents an anion; and k represents 0 or 1.

Merocyanine dyes are a group of dyes represented by the following general formula (B):

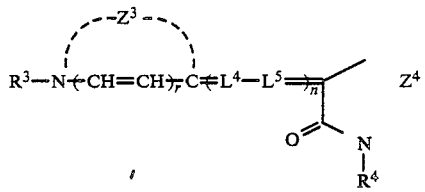

(B)

wherein $Z^3$ has the same meaning as $Z^1$ or $Z^2$; $R^3$ has the same meaning as $R^1$ or $R^2$; $L^4$ and $L^5$ each has the same meaning as $L^1$, $L_2$ or $L^3$; $Z^4$ represents atoms necessary to constitute a 5- or 6-membered hetero ring; $R^4$ represents a hydrogen atom, an unsubstituted or substituted alkyl group, an unsubstituted or substituted aryl group, or a heterocyclic ring group; r has the same meaning as p or q; and n has the same meaning as m.

Complex cyanine dyes are a group of dyes represented by the following general formula (C):

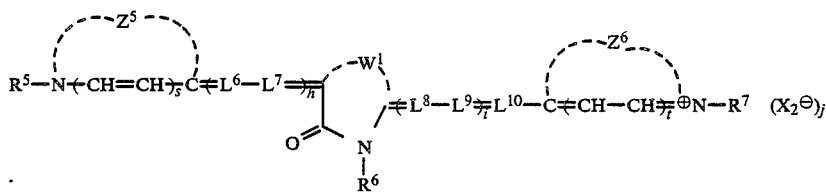

(C)

wherein $Z^5$ and $Z^6$ each has the same meaning as $Z^1$ or $Z^2$; $R^5$ and $R^7$ each has the same meaning as $R^1$ or $R^2$; $R^6$ has the same meaning as $R^4$; $L^6$, $L^7$, $L_8$, $L_9$ and $L^{10}$ each has the same meaning as $L^1$, $L^2$ or $L^3$; $W^1$ represents atoms necessary to constitute a 5- or 6-membered hetero ring; h and i each has the same meaning as m; s and t each has the same meaning as p or q; $X_2^{\ominus}$ has the same meaning as $X_1^{\ominus}$; and j has the same meaning as k.

Complex merocyanine dyes are a group of dyes represented by the following general formula (D):

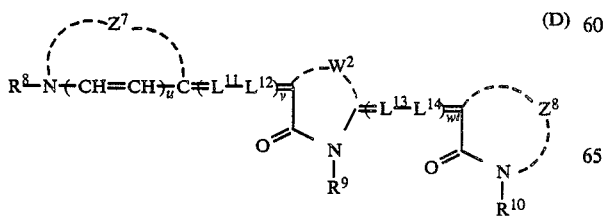

(D)

wherein $Z^7$ has the same meaning as $Z^1$ or $Z^2$; $Z^8$ has the same meaning as $Z^4$; $W^2$ has the same meaning as $W^1$; $R^8$ has the same meaning as $R^1$ or $R^2$; $R^9$ and $R^{10}$ each has the same meaning as $R^4$; $L^{11}$, $L^{12}$, $L^{13}$ and $L^{14}$ each has the same meaning as $L^1$, $L^2$ or $L^3$; v and w each has the same meaning as m; and u has the same meaning as p or q.

Hemicyanine dyes are a group of dyes represented by the following general formula (E):

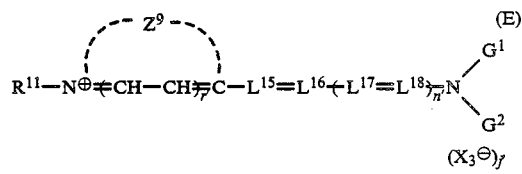

(E)

wherein $Z^9$ has the same meaning as $Z^1$ or $Z^2$; $R^{11}$ has the same meaning as $R^1$ or $R^2$; $L^{15}$, $L_{16}$, $L^{17}$ and $L^{18}$ each has the same meaning as $L^1$, $L^2$ or $L^3$; r' has the same meaning as p or q; $X_3^{\ominus}$ has the same meaning as $X_1^{\ominus}$; j' has the same meaning as k; n' repesents 0, 1 or 2; $G^1$ and $G^2$ may be the same or different, and each represents a hydrogen atom, an unsubstituted or substituted alkyl group, or an unsubstituted or substituted aryl group, or they may form a ring derived from cyclic secondary amine.

Holopolar cyanine dyes are a group of dyes represented by the following general formula (F):

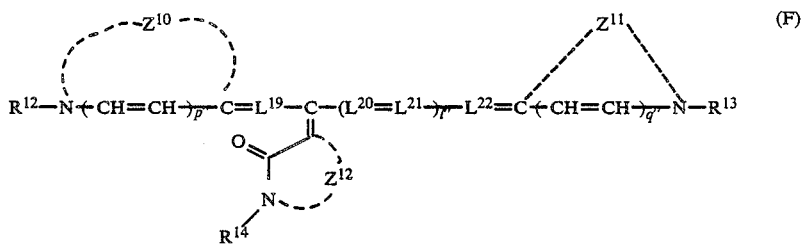

(F)

wherein $Z^{10}$ and $Z^{11}$ each has the same meaning as $Z^1$ or $Z^2$; $Z^{12}$ has the same meaning as $Z^4$; $R^{12}$ and $R^{13}$ each has the same meaning as $R^1$ or $R^2$; $R^{14}$ has the same meaning as $R^4$; $L^{19}$, $L^{20}$, $L^{21}$, and $L^{22}$ each has the same meaning as $L^1$, $L^2$ or $L^3$; l'' has the same meaning as m; and p'' and q'' each has the same meaning as p or q.

Styryl dyes are a group of dyes represented by the following general formula (G):

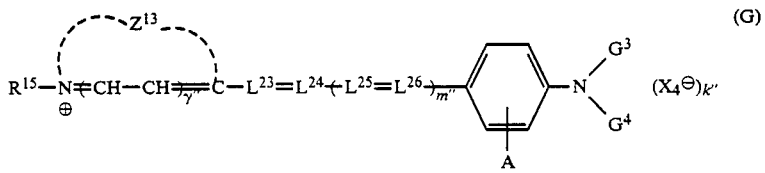

(G)

wherein $Z^{13}$ has the same meaning as $Z^1$; $R^{15}$ has the same meaning as $R^1$ or $R^2$; $L^{23}$, $L^{24}$, $L^{25}$ and $L^{26}$ each has the same meaning as $L^1$, $L^2$ or $L^3$; $\gamma''$ has the same meaning as p or q; m'' has the same meaning as m; $G^3$ and $G^4$ each has the same meaning as $G^1$ or $G^2$; k'' has the same meaning as k; and A represents a hydrogen atom, a halogen atom (e.g., a fluorine atom, a chlorine atom, a bromine atom, an iodine atom), an alkoxy group (e.g., a methoxy group, an ethoxy group, etc.), an alkyl group (e.g., a methyl group, an ethyl group, etc.), an aryl group (e.g., a phenyl group, etc.), an aralkyl group (e.g., a benzyl group, etc.), a cyano group, a nitro group, a carboxyl group, a hydroxyl group, an alkoxycarbonyl group (e.g., a methoxycarbonyl group, an ethoxycarbonyl group, etc.), a carbamoyl group, a sulfamoyl group, an amino group, an acylamino group (e.g., an acetylamino group, a benzoylamino group, a methanesulfonylamino group, etc.), and so on.

Hemioxonol dyes are a group of dyes represented by the following general formula (H):

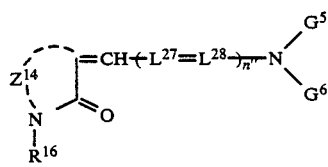

(H)

wherein $Z^{14}$ has the same meaning as $Z^4$; $R^{16}$ has the same meaning as $R^4$; $L^{27}$ and $L^{28}$ each has the same meaning as $L^1$, $L^2$ or $L^3$; $G^5$ or $G^6$ each has the same meaning as $G^1$ or $G^2$; and n'' has the same meaning as m.

These dyes are more specifically illustrated below.

5- or 6-membered hetero rings formed by $Z^1$, $Z^2$, $Z^3$, $Z^5$, $Z^6$, $Z^7$, $Z^9$, $Z^{10}$, $Z^{11}$ and $Z^{13}$ include thiazole nuclei (e.g., thiazole, 4-methylthiazole, 4-phenylthiazole, 4,5-dimethylthiazole, 4,5-diphenylthiazole, etc.), benzothiazole nuclei (e.g., benzothiazole, 4-chlorobenzothiazole, 5-chlorobenzothiazole, 6-chlorobenzothiazole, 5-nitrobenzothiazole, 4-methylbenzothiazole, 5-methylbenzothiazole, 6-methylbenzothiazole, 5-bromobenzothiazole, 6-bromobenzothiazole, 5-iodobenzothiazole, 5-phenylbenzothiazole, 5-methoxybenzothiazole, 6-methoxybenzothiazole, 5-ethoxybenzothiazole, 5-ethoxycarbonylbenzothiazole, 5-carboxybenzothiazole, 5-phenetylbenzothiazole, 5-fluorobenzothiazole, 5-chloro-6-methylbenzothiazole, 5,6-dimethylbenzothiazole, 5-hydroxy-6-methylbenzothiazole, tetrahydrobenzothiazole, 4-phenylbenzothiazole, etc.), naphthothiazole nuclei (e.g., naphtho[2,1-d]thiazole, naphtho[1,2-d]thiazole, naphtho[2,3-d]thiazole, 5-methoxynaphtho[1,2-d]thiazole, 7-ethoxynaphtho[2,1-d]thiazole, 8-methoxynaphtho[2,1-d]thiazole, 5-methoxynaphtho[2,3-d]thiazole, etc.), thiazoline nuclei (e.g., thiazoline, 4-methylthiazoline, 4-nitrothiazoline, etc.), oxazole nuclei (e.g., oxazole, 4-methyloxazole, 4-nitrooxazole, 5-methyloxazole, 4-phenyloxazole, 4,5-diphenyloxazole, 4-ethyloxazole, etc.), benzoxazole nuclei (e.g., benzoxazole, 5-chlorobenzoxazole, 5-methylbenzoxazole, 5-bromobenzoxazole, 5-fluorobenzoxazole, 5-phenylbenzoxazole, 5-methoxybenzoxazole, 5-nitrobenzoxazole, 5-trifluoromethylbenzoxazole, 5-hydroxybenzoxazole, 5-carboxybenzoxazole, 6-methylbenzoxazole 6-chlorobenzoxazole, 6-nitrobenzoxazole, 6-methoxybenzoxazole, 6-hydroxybenzoxazole, 5,6-dimethylbenzoxazole, 4,6-dimethylbenzoxazole, 5-ethoxybenzoxazole, etc.), naphthoxazole nuclei (e.g., naphtho[2,1-d]oxazole, naphtho[1,2-d]oxazole, naphtho[2,3-d]oxazole, 5-nitronaphtho[2,1-d]oxazole, etc.), oxazoline nuclei (e.g., 4,4-dimethyloxazoline, etc.), selenazole nuclei (e.g., 4-methylselenazole, 4-nitroselenazole, 4-phenylselenazole, etc.), benzoselenazole nuclei (e.g., benzoselenazole, 5-chlorobenzoselenazole, 5-nitrobenzoselenazole, 5-methoxybenzoselenazole, 5-hydroxybenzoselenazole, 6-nitrobenzoselenazole, 5-chloro-6-nitrobenzoselenazole, etc.), naphthoselenazole nuclei (e.g., naphtho[2,1-d]selenazole, naphtho[1,2-d]selenazole, etc.), 3,3-dialkylindolenine nuclei (e.g., 3,3-dimethylindolenine, 3,3-diethylindolenine, 3,3-dimethyl-5-cyanoindolenine, 3,3-dimethyl-6-nitroindolenine, 3,3-dimethyl-5-nitroindolenine, 3,3-dimethyl-5-methoxyindolenine, 3,3,5-trimethylindolenine, 3,3-dimethyl-5-chloroindolenine, etc.), imidazle nuclei (e.g., 1-alkylimidazole, 1-alkyl-4-phenylimidazole, 1-alkylbenzimidazole, 1-alkyl-5-chlorobenzimidazole, 1-alkyl-5,6-dichlorobenzimidazole, 1-alkyl-5-methoxybenzimidazole, 1-alkyl-5-cyanobenzimidazole, 1-alkyl-5-fluorobenzimidazole, 1-alkyl-5-trifluoromethylbenzimidazole, 1-alkyl-6-dichloro-5-cyanobenzimidazole, 1-alkyl-6-chloro-5-trifluoromethylbenzimidazole, 1-alkylnaphtho[1,2-d]imidazole, 1-allyl-5,6-dichlorobenzimidazole, 1-allyl-5-chlorobenzimidazole, 1-arylimidazole, 1-arylbenzimidazole, 1-aryl-5-chlorobenzimidazole, 1-aryl-5,6-dichlorobenzimidazole, 1-aryl-5-methoxybenzimidazole, 1-aryl-5-cyanobenzimidazole, 1-aryl-naphtho[1,2-d]imidazole, etc., wherein the alkyl moiety contains 1 to 8 carbon atoms, which include unsubstituted alkyl groups, e.g., a methyl group, an ethyl group, a propyl group, an isopropyl group, a butyl group, etc., hydroxysubstituted alkyl groups, e.g., a 2-hydroxyethyl group, a 3-hydroxypropyl group, etc., and wherein a methyl group or an ethyl group are particularly preferred, and the aryl moiety represents a phenyl group, a halogen (e.g., chlorine)-substituted phenyl group, an alkyl (e.g., methyl)-substituted phenyl group, an alkoxy (e.g., methoxy)-substituted phenyl group, etc., pyridine nuclei (e.g., 2-pyridine, 4-pyridine, 5-methyl-2-pyridine, 3-methyl-4-pyridine, etc.), quinoline nuclei (e.g., 2-quinoline, 3-methyl-2-quinoline, 5-ethyl-2-quinoline, 6-methyl-2-quinoline, 6-nitro-2-quinoline, 8-fluoro-2-quinoline, 6-methoxy-2-quinoline, 6-hydroxy-2-quinoline, 8-chloro-2-quinoline, 4-quinoline, 6-ethoxy-4-quinoline, 6-nitro-4-quinoline, 8-chloro-4-quinoline, 8-fluoro-4-quinoline 8-methyl-4-quinoline, 8-methyl-4-quinoline, 8-methoxy-4-quinoline, isoquinoline, 6-nitro-1-isoquinoline, 6-nitro-1-isoquinoline, 3,4-dihydro-1-isoquinoline, 6-nitro-3-isoquinoline, etc.), imidazo[4,5- b]quinoxaline nuclei (e.g., 1,3-diethylimidazo[4,5-b]quinoxaline, 6-chloro-1,3-diallylimidazo[4,5-b]quinoxaline, etc.), oxadiazole nuclei, thiadiazole nuclei, tetrazole nuclei, pyrimidine nuclei, and so on.

Five- or six-membered rings formed by $Z^4$, $Z^8$, $Z^{12}$ and $Z^{14}$ include rhodanine nuclei, 2-thiohydantoin nuclei, 2-thioxooxazolidine-4-one nuclei, 2-pyrazoline-5-one nuclei, barbituric acid nuclei, 2-thiobarbituric acid nuclei, thiazolidine-2,4-dione nuclei, thiazolidine-4-one nuclei, isooxazolone nuclei, hydantoin nuclei, indandione nuclei and so on.

Five- or six-membered hetero rings formed by $W^1$ and $W^2$ include the same nuclei as those formed by $Z^4$, $Z^8$, $Z^{12}$ and $Z^{14}$ except that an oxo group or a thioxo group located at their respectively appropriate positions are removed therefrom.

$L^1$ to $L^{28}$ each represents a methine group or a substituted methine group. Specific examples of substituents suitable for the methine group include alkyl groups (e.g., a methyl group, an ethyl group, etc.), aryl groups (e.g., a phenyl group, etc.), aralkyl groups (e.g., a benzyl group, etc.), halogen atoms (e.g., chlorine, bromine, etc.), alkoxy groups (e.g., a methoxy group, an ethoxy group, etc.), and so on. In addition, some pair of substituents on the methine chain may combine with each other to form a 4- to 6-membered ring.

Alkyl groups represented by $R^1$, $R^2$, $R^3$, $R^5$, $R^7$, $R^8$, $R^{11}$, $R^{12}$, $R^{13}$ and $R^{15}$ are substituted or unsubstituted, and contain 1 to 18 carbon atoms, preferably 1 to 7 carbon atoms, and particularly preferably 1 to 4 carbon atoms. Specific examples thereof include unsubstituted alkyl groups such as a methyl group, an ethyl group, a propyl group, an isopropyl group, a butyl group, an isobutyl group, a hexyl group, an octyl group, a dodecyl group, an octadecyl group, etc., and substituted alkyl groups, such as aralkyl groups (e.g., a benzyl group, a 2-phenylethyl group, etc.), hydroxyalkyl groups (e.g., a 2-hyroxyethyl group, a 3-hydroxypropyl group, etc.), carboxyalkyl groups (e.g., a 2-carboxyethyl group, a 3-carboxypropyl group, a 4-carboxybutyl group, a carboxymethyl group, etc.), alkoxyalkyl groups (e.g., a 2-methoxyethyl group, a 2-(2-methoxyethoxy)ethyl group, etc.), sulfoalkyl groups (e.g., a 2-sulfoethyl group, a 3-sulfopropyl group, a 3-sulfobutyl group, a 4-sulfobutyl group, a 2-(3-sulfopropoxy)ethyl group, a 2-hydroxy-3-sulfopropyl group, a sulfopropoxyethoxyethyl group, etc.), a sulfatoalkyl groups (e.g., a 3-sulfatopropyl group, a 4-sulfatobutyl group, etc.), heterocyclic ring substituted groups (e.g., a 2-(pyrrolidine-2-one-1-yl)ethyl group, a tetrahyrofurfuryl group, etc.), a 2-acetoxyethyl group, a carbomethoxyethyl group, a 2-methanesulfonylaminoethyl group, an allyl group, and so on.

As for the unsubstituted alkyl groups, the substituted alkyl groups, the unsubstituted aryl groups, the substituted aryl groups, and the heterocyclic ring groups, which are represented by $R^4$, $R^6$, $R^9$, $R^{10}$, $R^{14}$ and $R^{16}$, respectively, alkyl groups containing 1 to 18, preferably 1 to 7, particularly preferably 1 to 4, carbon atoms (e.g., a methyl group, an ethyl group, a propyl group, an isopropyl group, a butyl group, an isobutyl group, a hexyl group, an octyl group, a dodecyl group, an octadecyl group, etc.). are desirable; substituted alkyl groups such as aralkyl groups (e.g., a benzyl group, a 2-phenylethyl group, etc.), hydroxyalkyl groups (e.g., a 2-hydroxyethyl group, a 3-hydroxypropyl group, etc.), carboxyalkyl groups (e.g., a 2-carboxyethyl group, a 3-carboxypropyl group, a 4-carboxybutyl group, a carboxymethyl group, etc.), alkoxyalkyl groups (e.g., a 2-methoxyethyl group, a 2-(2-methoxyethoxy)ethyl group, etc.), sulfoalkyl groups (e.g., a 2-sulfoethyl group, a 3-sulfopropyl group, a 3-sulfobutyl group, a 4-sulfobutyl group, a 2-(3-sulfopropoxy)ethyl group, a 2-hydroxy-3-sulfopropyl group, a 3-sulfopropoxyethoxyethyl group, etc.), sulfatoalkyl groups (e.g., a 3-sulfatopropyl group, a 4-sulfatobutyl group, etc.), heterocyclic ring substituted alkyl groups (e.g., a 2-(pyrrolidone-2-one-1-yl)ethyl group, a tetrahydrofurfuryl group, a 2-morpholinoethyl group, etc.), a 2-acetoxyethyl group, a carbomethoxymethyl group, a 2-methanesulfonylaminoethyl group, an allyl group and so on are desirable, aryl groups such as phenyl group, a 2-naphthyl group and so on are desirable; substituted aryl groups such as a 4-carboxyphenyl group, a 4-sulfophenyl group, a 3-chlorophenyl group, a 3-methylphenyl group and so on are desirable; and heterocyclic ring groups such as a 2-pyridyl group, a 2-thiazolyl group and so on are desirable.

$J^1$, $J^2$, R and G in general formula (I) are described in detail below.

$J^1$ represents an unsubstituted or substituted alkylene group (e.g., preferably comprising 1 to 10 carbon atoms, particularly preferably 1 to 4 carbon atoms, such as a methylene group, an ethylene group, a propylene group, a 3-methylpropylene group, a 3-oxabutylene group, etc.), an unsubstituted or substituted arylene group (e.g., preferably comprising 6 to 10 carbon atoms, particularly preferably 6 to 8 carbon atoms, such as a p-phenylene group, an m-phenylene group, a 2-methyl-p-phenylene group, etc.), an unsubstituted or substituted aralkylene group (e.g., preferably comprising 7 to 12 carbon atoms, particularly preferably 7 to 8 carbon atoms, such as a phenylmethylene group, a 2-phenylethylene group, etc.), or an unsubstituted or substituted alkarylene group (e.g., preferably comprising 7 to 12 carbon atoms, particularly preferably 7 to 8 carbon atoms, such as a methylphenylene group, an ethylphenylene group, etc.).

Arylene groups represented by $J^2$, which may be substituted, include those containing preferably 6 to 36 carbon atoms, particularly preferably 6 to 20 carbon atoms, such as a p-phenylene group, an m-phenylene group, a 1,4-naphthylene group, a 1,5-naphthylene group, etc. Typical examples of substituent groups with which these arylene groups may be substituted include straight chain, branched chain and cyclic alkyl groups (preferably having 1 to 20 carbon atoms), aralkyl groups (preferably monocyclic and bicyclic aralkyl groups having an alkyl moiety containing 1 to 3 carbon atoms), alkoxy groups (preferably having 1 to 20 carbon atoms), substituted amino groups (preferably containing as a substituent group an alkyl group having 1 to 20 carbon atoms), acylamino groups (preferably having 2 to 30 carbon atoms), sulfonamido groups (preferably having 1 to 30 carbon atoms), ureido groups (preferably having 1 to 30 carbon atoms), and halogen atoms.

Alkyl groups represented by R in general formula (I) are preferably those having 1 to 4 carbon atoms, which may be substituted with a halogen atom, a cyano group, a carboxy group, a sulfo group, an alkoxy group, a phenyl group or so on.

Aryl groups represented by R in general formula (I) are preferably monocyclic and bicyclic aryl groups, e.g., those containing a benzene ring, and they may be substituted with a halogen atom, an alkyl group, a cyano group, a carboxyl group, a sulfo group, or so on.

Alkoxy groups represented by R in general formula (I) are preferably those having 1 to 8 carbon atoms, which may be substituted with a halogen atom, an aryl group, or so on.

Aryloxy groups represented by R in general formula (I) are preferably monocyclic aryloxy groups, which may be substituted with a halogen atom, or so on.

Of the foregoing groups represented by R, preferred are a hydrogen atom, a methyl group, a methoxy group, an ethoxy group and substituted or unsubstituted phenyl groups. Especially preferred is a hydrogen atom, where G represents a carbonyl group.

When G represents a sulfonyl group, preferred R groups are a methyl group, an ethyl group, a phenyl group or a 4-methylphenyl group, and especially preferred is a methyl group.

When G represents a phosphoryl group, preferred R groups are a methoxy group, an ethoxy group, an butoxy group, a phenoxy group or a phenyl group, and especially preferred is a phenoxy group.

When G represents a sulfoxy group, preferred R groups are a cyanobenzyl group, a methylthiobenzyl group or the like.

When G represents an N-substituted or unsubstituted iminomethylene group, preferred R groups are a methyl group, an ethyl group, or a substituted or unsubstituted phenyl group.

Of the groups represented by G, the most preferable one is a carbonyl group.

Specific examples of the compound represented by general formula (I) of the present invention are illustrated below. However, the present invention should not be construed as being limited to these examples.

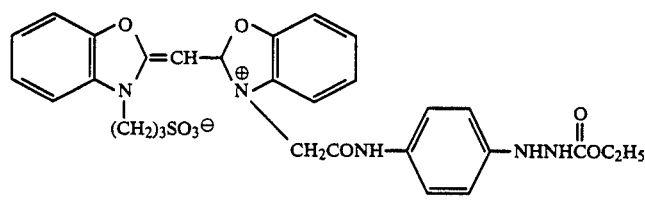

1

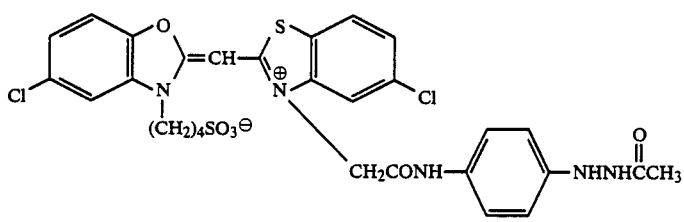

2

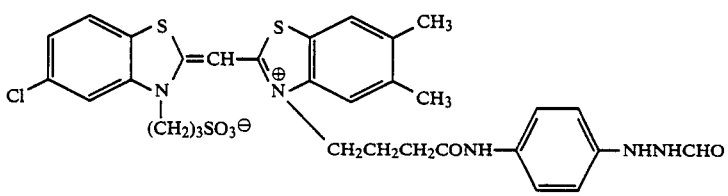

3

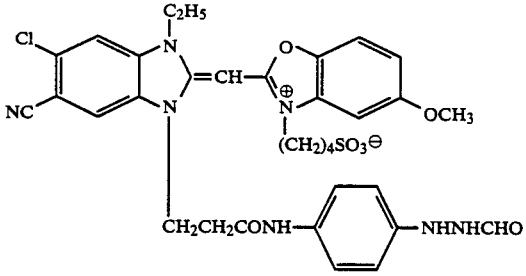

4

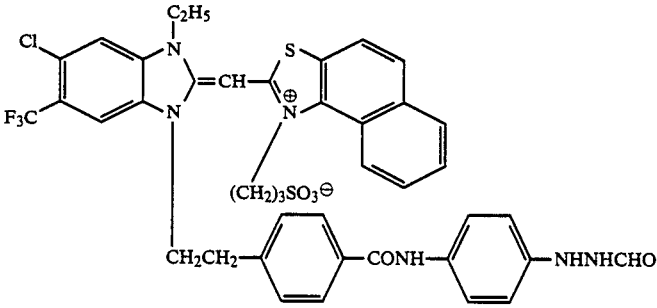

5

-continued
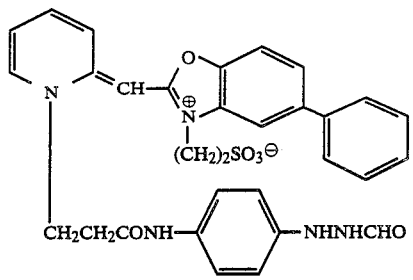
6
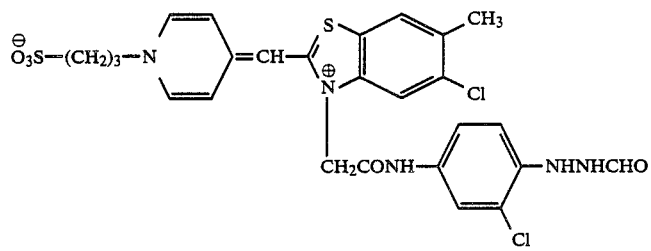
7
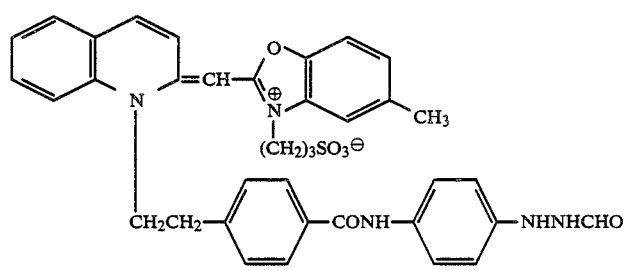
8
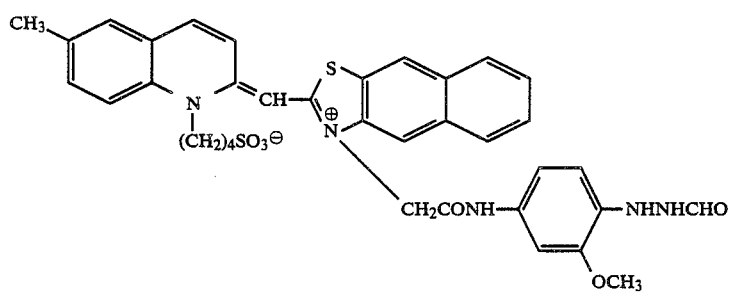
9
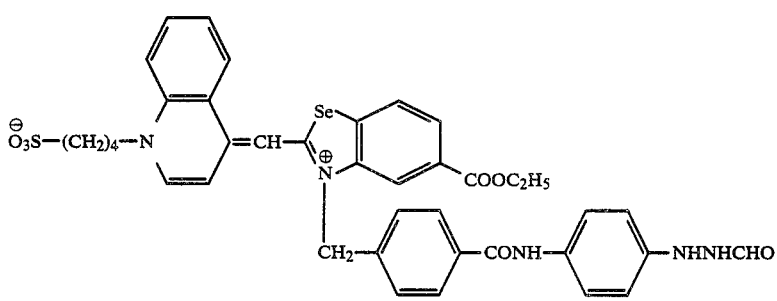
10

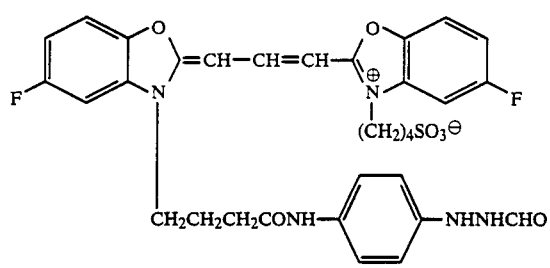
11
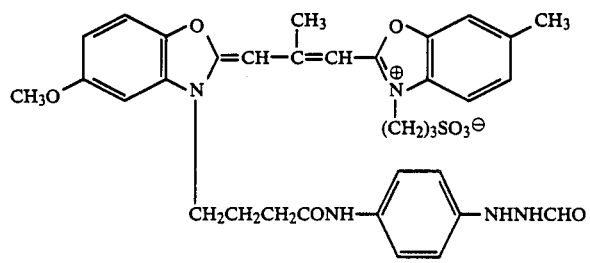
12
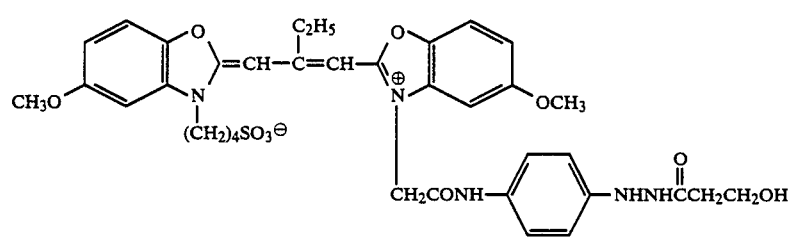
13
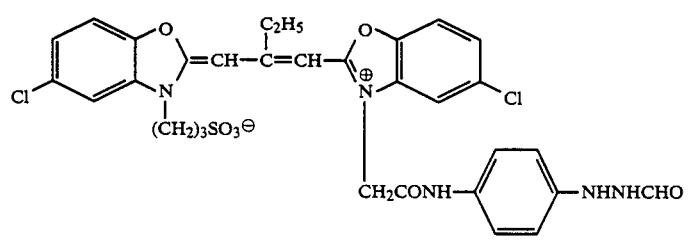
14
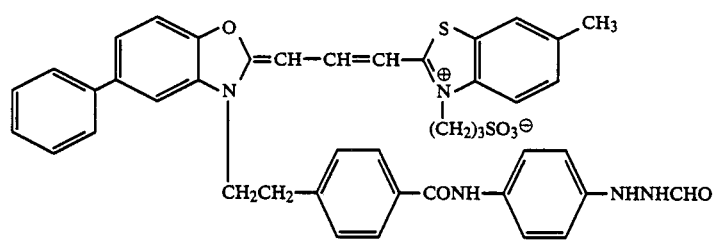
15
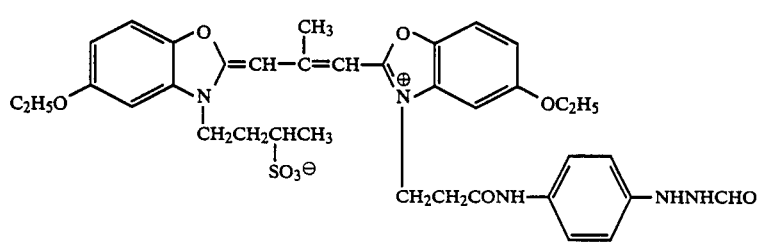
16
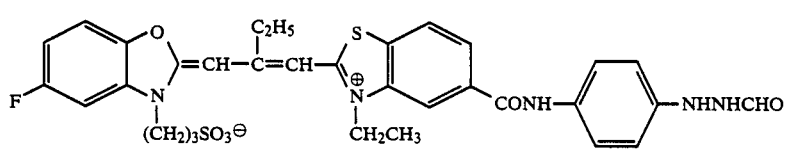
17

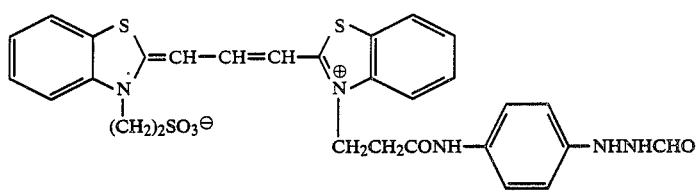
18
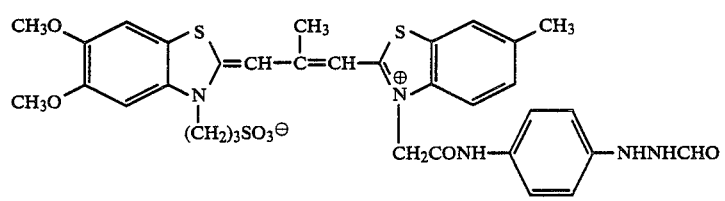
19
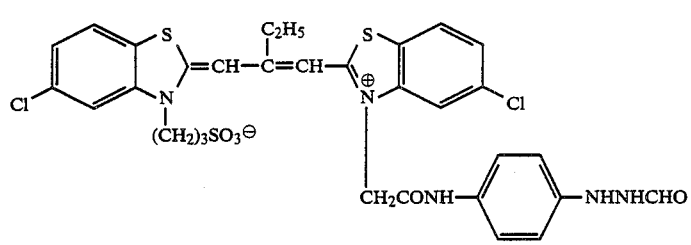
20
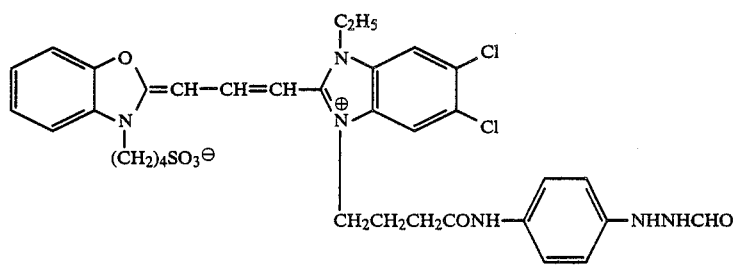
21
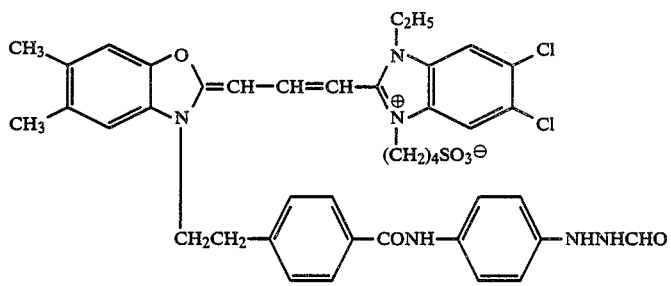
22
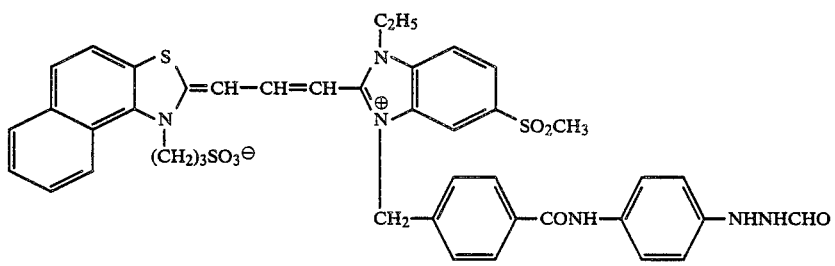
23

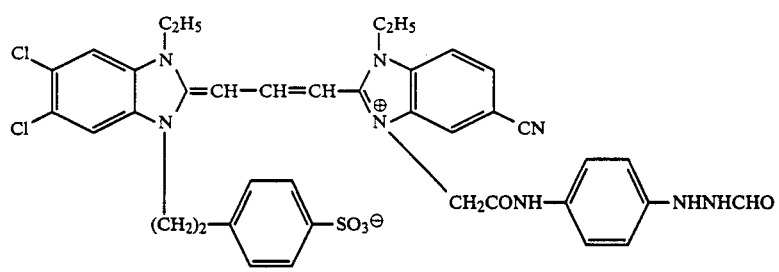
24
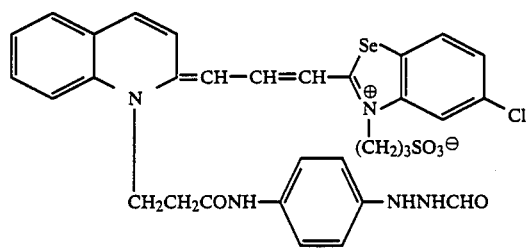
25
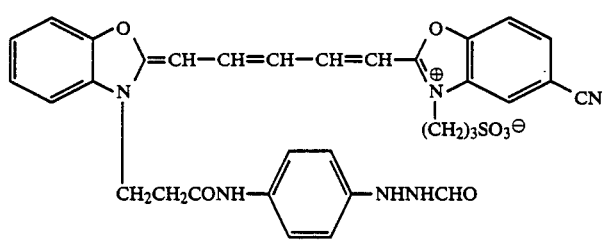
26
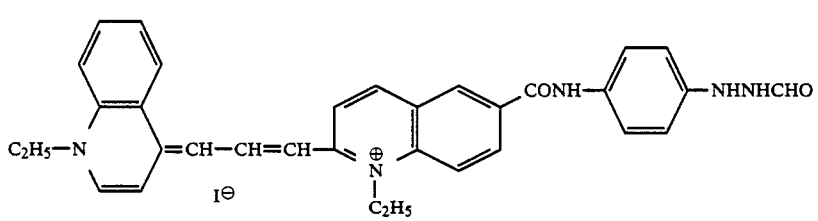
27
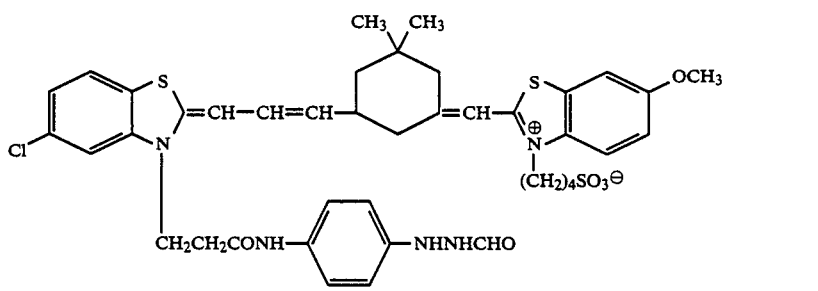
28
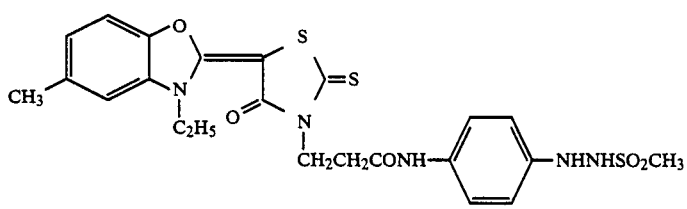
29

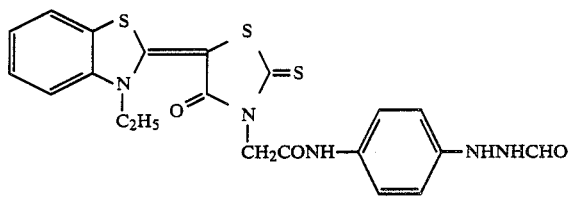
30
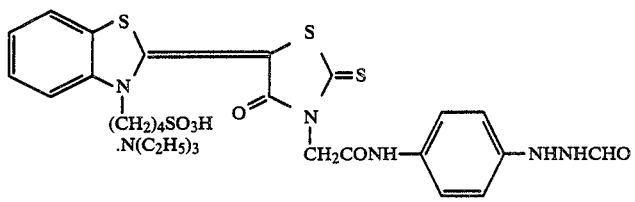
31
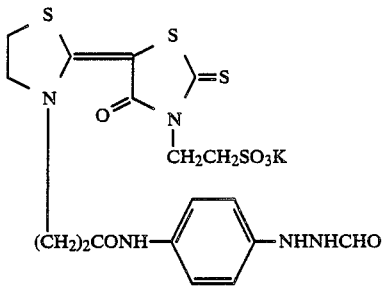
32
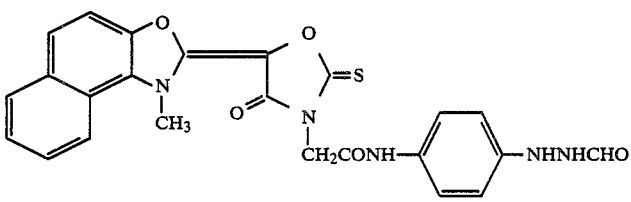
33
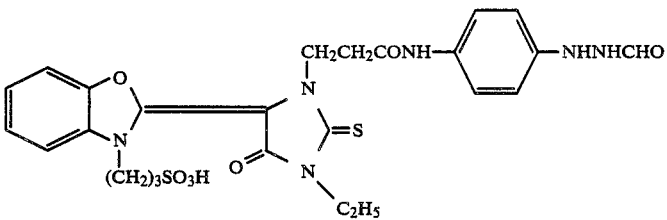
34
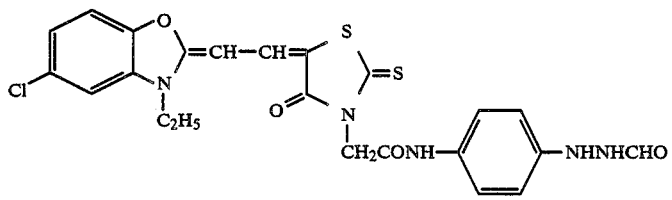
35
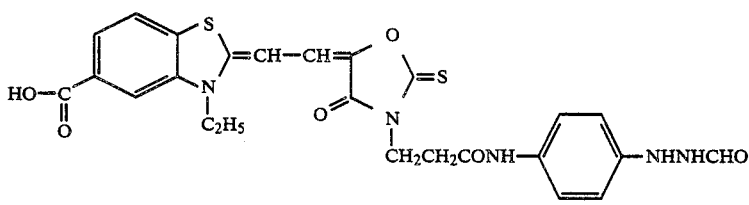
36

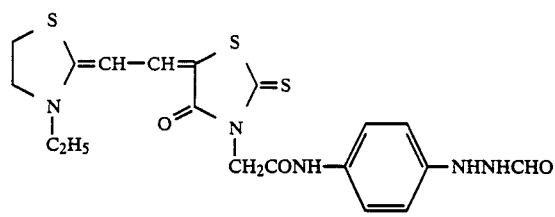
37
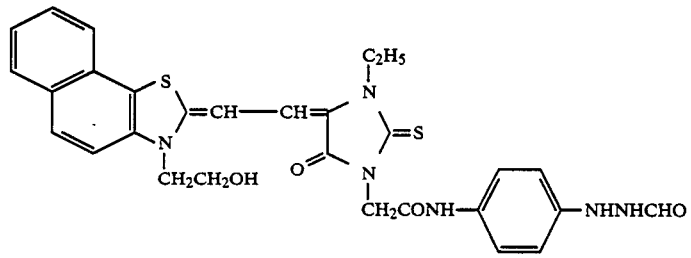
38
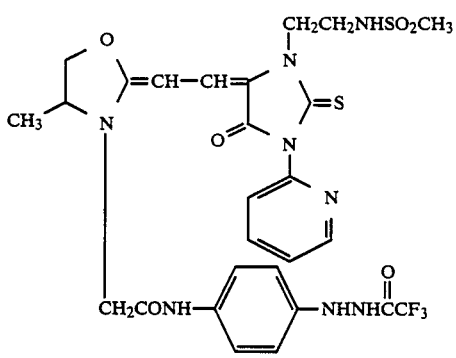
39
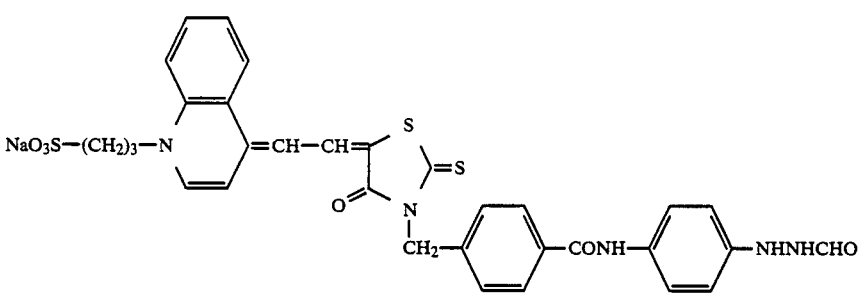
40
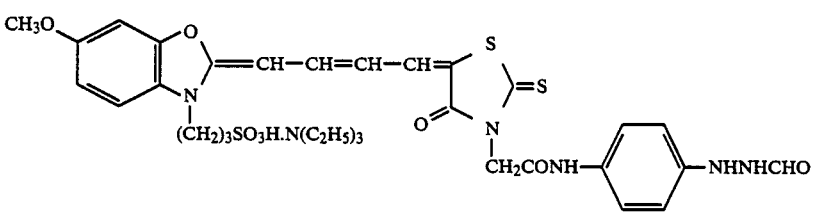
41
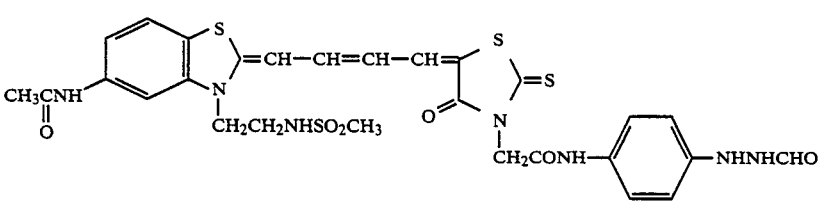
42

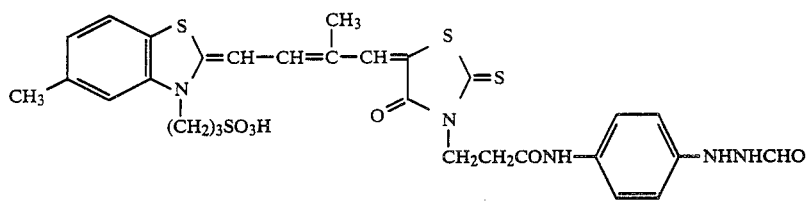
43
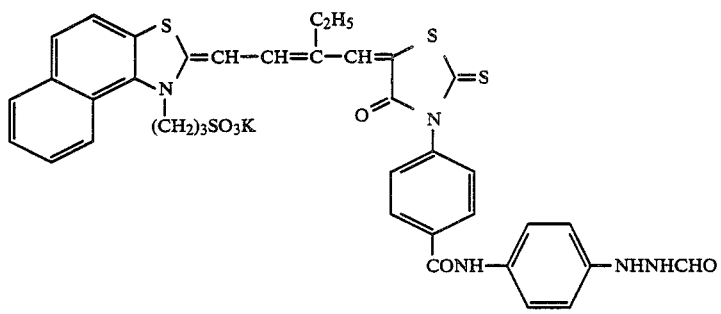
44
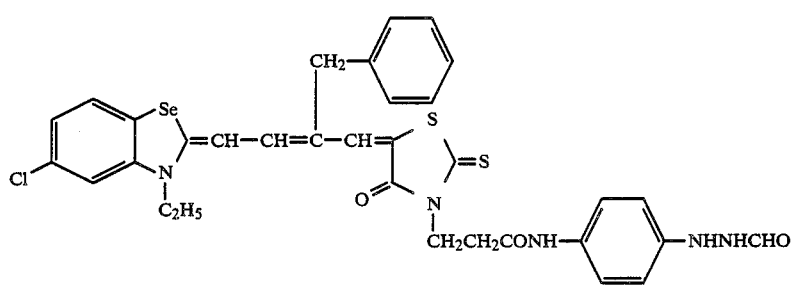
45
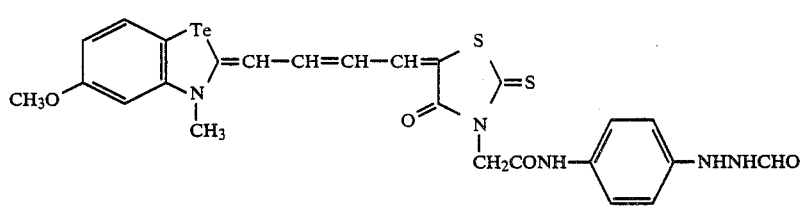
46
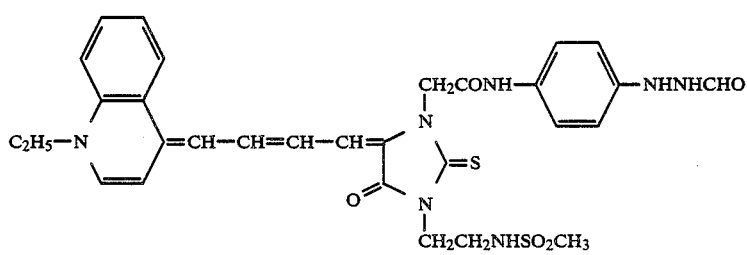
47
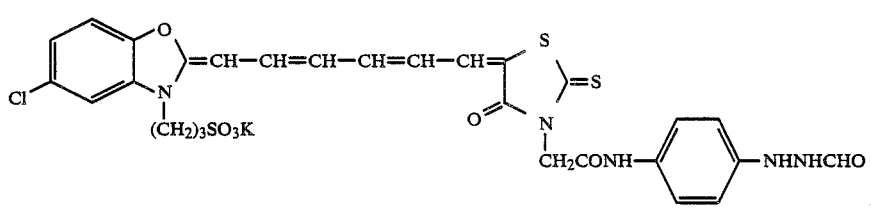
48

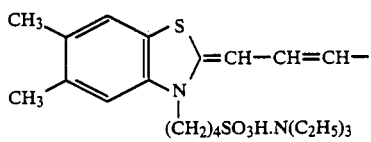 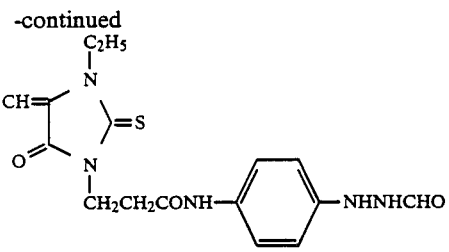

49

-continued

These compounds can be produced by using either of two processes; one process comprises synthesizing a dye moiety thereof and thereafter forming an amido linkage sandwiched in between $J^1$ and $J^2$ of general formula (I), and the other comprises forming the amido linkage as described above at an intermediate stage and thereafter converting such to a desired dye. Formation of such an amido linkage can be carried out easily by referring to S. R. Sandler & W. Karo, *Organic Functional Group Preparations*, Academic Press, New York, London (1968), and so on. Synthesis of a hydrazine derivative moiety can be effected with ease by referring to the descriptions thereof in Japanese Patent Application (OPI) Nos. 20921/78, 20922/78, 66732/78 and 20318/78, or the references cited in *Research Disclosure*, No. 23510, pp. 346–352 (September 1983).

A dye moiety of the compound represented by general formula (I) of the present invention can be synthesized according to methods described in F. M. Hamer, *Heterocyclic Compounds—Cyanine Dyes and Related Compounds*, chapter 5, pages 116–147, John Wiley & Sons, New York, London (1964), D. M. Sturmer, *Heterocyclic Compounds—Special Topics in Heterocyclic Chemistry—*, chapter 8, pages 482–515, John Wiley & Sons, New York London (1977), Japanese Patent Application (OPI) No. 78445/85, and so on.

Synthesis examples of representative compounds of the present invention are described below.

SYNTHESIS EXAMPLE 1

Synthesis of Compound 20

To a mixture of 600 mg (1 millimole) of 3-[2-{2-(3-carboxymethyl-5-chlorobenzothiazoline-2-indenemethyl)butene-1-yl}-5-chloro-3-benzothiazolio]propanesulfonate, 151 mg (1 millimole) of 2-(4-aminophenyl)-1-formylhydrazine, 206 mg (1 millimole) of N,N'-dicyclohexylcarbodiimide and a slight amount of p-toluenesulfonic acid was added 10 ml of pyridine. The resulting mixture was stirred at room temperature for one day and night. Thus, crystals were separated out, and these were filtered off and boiled with a methanol/chloroform 1/1 mixture for the purpose of washing. Then, the crystals were dissolved in benzyl alcohol, and reprecipitated by addition of methanol. Thus, the intended compound was obtained. Yield, 150 mg (20.5%). Melting Point, 265°–266° C.

SYNTHESIS EXAMPLE 2

Synthesis of Compound 30

(i) Synthesis of 3-{4-(2-formylhydrazino)phenyl}carbamoylmethylrhodanine

To a mixture of 1.91 g (10 millimole) of 3-carboxymethylrhodanine, 1.51 g (10 millimole) of 2-(4-aminophenyl)-1-formylhydrazine and 2.06 g (10 millimole) of N,N'-dicyclohexylcarbodiimide was added 50 ml of tetrahydrofuran. The resulting mixture was stirred for 5 hours at room temperature to precipitate crystals. These were filtered off, and dissolved in 50 ml of N,N-dimethylformamide (DMF). The matter remaining insoluble was removed from the solution. 100 ml of water was added to the filtrate, and allowed to stand for one night to precipitate crystals. These were filtered off, and washed with water and methanol. Thus, the intended compound was obtained. Yield, 2.98 g (92%). Melting Point, 260° C. (decomposed).

(ii) Conversion to Dye

Fifty ml of acetonitrile was added to a mixture of 1.32 g (1/300 mole) of 3-ethyl-2-ethylthiobenzothiazolium p-toluenesulfonate and 1.08 g (1/300 mole) to the rhodanine synthesized in the paragraph (i), and stirred for one hour at room temperature. Thereto, 1.4 ml of triethylamine was added, and stirred for an additional 2 hours at room temperature to precipitate crystals. These were filtered off, and washed with acetonitrile. The crystals obtained were dissolved in 15 ml of DMF, and reprecipitated by addition of 30 ml of ethyl acetate. The thus-obtained precipitate was washed by boiling in methanol. Yield, 1.37 g (85%). Melting Point, 297°–298° C.

SYNTHESIS EXAMPLE 3

Synthesis of Compound 37

Twenty ml of chloroform was added to a mixture of 330 mg (1 millimole) of 3-carboxymethyl-5-{2-(3-ethylthiazolidine-2-ylidene)ethylidene}rhodanine, 151 mg (1 millimole) of 2-(4-aminophenyl)-1-formylhydrazine and 206 mg (1 millimole) of N,N'-dicyclohexylcarbodiimide, and stirred for 5 hours at room temperature. Then, crystals were precipitated. These were filtered off, and dissolved in DMF. To the soluble part was added ethyl acetate to cause reprecipitation. This reprecipitation procedure was repeated, and then the precipitate was washed by boiling in methanol. Thus, the intended compound was obtained. Yield, 315 mg (68%). Melting Point, 279°–280° C. (decomposed).

The compounds of the present invention other than those exemplified immediately above can also be synthesized according to the methods employed in the foregoing synthesis examples and the literature cited hereinbefore.

The compound represented by general formula (I) of the present invention is contained in a silver halide photographic emulsion in an amount of from about $1 \times 10^{-6}$ to about $5 \times 10^{-3}$ mole, preferably from $1 \times 10^{-5}$ to $2.5 \times 10^{-3}$ mole, particularly preferably from $4 \times 10^{-5}$ to $1 \times 10^{-3}$ mole, per mole of silver halide.

The sensitizing dyes to be employed in the present invention can be dispersed directly into emulsions. On the other hand, these may be first dissolved in proper solvents, such as methyl alcohol, ethyl alcohol, n- propanol, methyl cellosolve, acetone, water, pyridine, and a mixture of two or more thereof, and then added to emulsions in the form of a solution. In dissolving these sensitizing dyes, ultrasonic waves also may be utilized. In addition, these sensitizing dyes can be incorporated into emulsions using other various methods. For instance, a method in which a dye is dissolved in a volatile organic solvent, where the resulting solution is dispersed into a hydrophilic colloid, and this dispersion is then added to an emulsion, is described, e.g., in U.S. Pat. No. 3,469,987; another method in which a water-insoluble dye is dispersed into a water-soluble solvent without dissolving the dye therein, and the resulting dispersion is added to an emulsion, is described, e.g., in Japanese Patent Publication No. 24185/71; still another method in which a dye is dissolved in a surface active agent, and the resulting solution is then added to an emulsion is described, e.g., in U.S. Pat. No. 3,822,135; a further method in which a dye is dissolved using a compound to render spectrum of sensitizing dyes red-shift, and the resulting solution is added to an emulsion is described, e.g., in Japanese Patent Application (OPI) No. 74624/76; and a still further method in which a dye is dissolved in an acid having substantially no water content, and the resulting solution is then added to an emulsion is described in Japanese Patent Application (OPI) No. 80826/75. Also, other methods, such as those described in U.S. Pat. Nos. 2,912,343, 3,342,605, 2,996,287, 3,429,835, etc., can be employed.

The sensitizing dyes may be added to silver halide emulsions at any stage of the production process of the emulsions. For example, these may be added in the course of grain formation, in the course of chemical ripening of the emulsions, before coating of the emulsions, or so on.

The sensitizing dyes of the present invention may be added as a mixture of two or more thereof. Also, individual sensitizing dyes may be added alone.

Further, the sensitizing dyes of the present invention may be used in combination with other sensitizing dyes. Sensitizing dyes usable in combination with those of the present invention include dyes described, e.g., in U.S. Pat. Nos. 3,703,377, 2,688,545, 3,397,060, 3,615,635 and 3,628,964, British Pat. Nos. 1,242,588 and 1,293,862, Japanese Patent Publication Nos. 4936/68, 14030/69 and 10773/68, U.S. Pat No. 3,416,927, Japanese Patent Publication No. 4930/68, U.S. Pat. Nos. 3,615,613, 3,615,632, 3,617,295 and 3,635,721, and so on.

Silver halide emulsions which can be used in the present invention are usually prepared by mixing a solution of a water soluble silver salt (e.g., AgNO$_3$) with a solution of a water soluble halide (e.g., KBr) in the presence of a solution of a water-soluble high polymer such as gelatin. Suitable examples of silver halides include silver chloride, silver bromide, and mixed silver halides such as silver chlorobromide, silver iodobromide, silver chloroiodobromide, and the like. A mean grain size of silver halide grains (the grain size as used herein refers to the average grain diameter for grains spherical or approximately spherical in shape, while it refers to an average edge length in case of cubic grains; in both cases, it is represented by the mean based on projected areas of the grains) is preferably 5 microns or less in the present invention. The distribution of the grain size may be either narrow (so-called monodisperse) or broad.

These silver halide grains may comprise any crystal shape, e.g., that of a cube, a tetradecahedron, a rhombic dodecahedron or an octahedron, a composite form of two or more thereof, a spherical shape or a plate-like shape, or so on.

Also, tabular grains having a diameter/thickness ratio of 5 or more may be employed. In this case, the tabular grains can be present in the emulsion in such a content as to form 50% or more of the whole grains, based on the projected area. Details of such grains are described in Japanese Patent Application (OPI) Nos. 127921/83 and 113927/83, and so on.

Two or more silver halide emulsions prepared separately may be employed in the form of a mixture. In addition, the silver halide grains may be uniform throughout in crystal structure, they may have a layer structure such that the interior and the surface of the grains differ in halide composition, or so-called conversion type silver halide grains as described in British Pat. No. 635,841 and U.S. Pat. No. 3,622,318, may be employed. Further, either silver halide grains of the type which form latent images predominantly at the surface of the grains, or grains of the type which form latent image inside the grains, can be used.

These photographic emulsions can be prepared using various methods as described, e.g., in T. H. James, *The Theory of the Photographic Process*, 4th ed., MacMillian, New York (1976), P. Glafkides, *Chemie et Photographique*, Paul Montel, Paris (1957), G. F. Duffin, *Photographic Emulsion Chemistry*, The Focal Press, London (1966), V. L. Zelikman, et al. *Making and Coating Photographic Emulsion*, The Focal Press, London (1966) and so on. More specifically, any conventional process, e.g., the acid process, the neutral process, the ammonia process and so on, can be employed.

Suitable methods for reacting a water-soluble silver salt with a water-soluble halide include, e.g., a single jet method, a double jet method or a combination thereof.

Also, a method in which silver halide grains are produced in the presence of excess silver ion (known as a reverse mixing method) can be employed. Moreover, the controlled double jet method, in which the pAg of the liquid phase in which silver halide grains are to be precipitated is maintained constant, may be employed. According to this method, silver halide emulsions having a regular crystal form and an almost uniform grain size can be obtained.

Two or more of silver halide emulsions prepared separately may be used in a form of mixture.

In a process of producing silver halide grains or allowing the produced silver halide grains to ripen physically, cadmium salts, zinc salts, lead salts, thallium salts, iridium salts or complexes thereof, rhodium salts or complexes thereof, iron salts or complexes thereof and the like may be present.

In addition, at the time of producing these silver halide grains, silver halide solvents, such as ammonia, potassium rhodanide, ammonium rhodanide, thioether compounds (e.g., those described in U.S. Pat. Nos. 3,271,157, 3,574,628, 3,704,130, 4,297,439 and 4,276,374, etc.), thione compounds (e.g., those described in Japanese Patent Application (OPI) Nos. 144319/78, 82408/78 and 77737/80, etc.), amine compounds (e.g., those described in Japanese Patent Application (OPI) No. 100717/79, etc.), as well as other known solvents, can be used for the purpose of controlling grain growth.

Silver halide emulsions contemplated for use in the present invention may be what are known as primitive emulsions, that is, chemically unsensitized emulsions, but are usually chemically sensitized. Chemical sensitization can be carried out using processes described in P. Glafkides, *Chimie et Photographique*, supra, V. L. Zelikman et al, *Making and Coating Photographic Emulsions*, supra, or H. Frieser, *Die Grundlagen der Photographischen Prozesse mit Silberhalogeniden*, Academische Verlagsgesellschaft (1968).

More specifically, sulfur sensitization using sulfur-containing compounds capable of reacting with silver ions or active gelatin (e.g., thiosulfates, thioureas, mercapto compounds, rhodanines, etc.), reduction sensitization using reducing materials (e.g., stannous salts, amines, hydrazine derivatives, formamidinesulfinic acid, silane compounds, etc.), noble metal sensitization using noble metals (e.g., gold compounds, complex salts of Group VIII metals such as platinum, iridium, palladium, etc.) and so on can be employed individually or as a combination thereof to effect chemical sensitization of the grains.

In addition, other sensitizers, such as polyoxyethylene derivatives (as described in British Pat. No. 981,470, Japanese Patent Publication No. 6475/56, U.S. Pat. No. 2,716,062, etc.), polyoxypropylene derivatives, a quaternary ammonium group-containing derivatives, and so on, may also be present.

The photographic emulsions to be employed in the present invention can contain a wide variety of compounds for purposes of preventing fogging and stabilizing photographic functions during production, storage or photographic processing. More specifically, azoles (e.g., benzothiazolium salts, nitroimidazoles, nitrobenzimidazoles, chlorobenzimidazoles, bromobenzimidazoles, nitroindazoles, benzotriazoles, aminotriazoles, and the like); mercapto compounds (e.g., mercaptothiazoles, mercaptobenzothiazoles, mercaptobenzimidazoles, mercaptothiadiazoles, mercaptotetrazoles (especially 1-phenyl-5-mercaptotetrazole), mercaptopyrimidines, mercaptotriazines, etc.); thioketo compounds such as oxazolinethione; azaindenes (e.g., triazaindenes, tetraazaindenes (especially (1,3,3a,7)tetraazaindenes substituted by a hydroxy group at the 4-position), pentaazaindenes, etc.); and many other compounds known as antifoggants or stabilizers, such as benzenethiosulfonic acid, benzenesulfinic acid, benzenesulfonic acid amide and so on can be added to the photographic emulsion of the present invention.

Further detailed examples of those compounds and usage thereof can be found in U.S. Pat. Nos. 3,954,474 and 3,982,947, and Japanese Patent Publication No. 28660/77.

In the light-sensitive material comprising the emulsion of the present invention, gelatin is advantageously used as a binder or a protective colloid for the emulsion layers and interlayers of the light-sensitive material. Hydrophilic colloids other than gelatin can also be used.

For instance, other such colloids that can be used include proteins such as gelatin derivatives, graft copolymers of gelatin and other high molecular weight polymers, albumin, casein, etc.; sugar derivatives such as cellulose derivatives (e.g., hydroxyethyl cellulose, carboxymethyl cellulose, cellulose sulfate, etc.), sodium alignate, starch derivatives and the like; and various kinds of synthetic hydrophilic high molecular substances such as homo- or co-polymers including polyvinyl alcohol, polyvinyl alcohol partial acetal, poly-N-vinylpyrrolidone, polyacrylic acid, polymethacrylic acid, polyacrylamide, polyvinylimidazole, polyvinylpyrazole, and so on.

Suitable type of gelatin include not only lime-processed gelatins, but also acid-processed gelatins and enzyme-processed gelatins, as described, e.g., in *Bull. Soc. Sci. Phot. Japan*, No. 16, p. 30 (1966). In addition, hydrolysis products of gelatin and enzymatic degradation products of gelatin can also be used.

Photographic emulsion layers and other hydrophilic colloid layers of the photographic light-sensitive material comprising the emulsion of the present invention may contain inorganic or organic hardeners. Suitable examples of hardeners which can be used include chromium salts (e.g., chrome alum, chromium acetate, etc.), aldehydes (e.g., formaldehyde, glyoxal, glutaraldehyde, etc.), N-methylol compounds (e.g., dimethylol urea, methylol dimethylhydantoin, etc.), dioxane derivatives (e.g., 2,3-dihydroxydioxane, etc.), active vinyl-containing compounds (e.g., 1,3,5-triacryloyl-hexahydro-s-triazine, 1,3-vinylsulfonyl-2-propanol, etc.), active halogen-containing compounds (e.g., 2,4-dichloro-6-hydroxy-s-triazine, etc.), mucohalogenic acids (e.g., mucochloric acid, mucophenoxychloric acid, etc.), and so on. These hardeners can be used alone or in combination.

The photographic emulsion layers and other hydrophilic colloid layers of the light-sensitive material produced in accordance with the present invention may contain surface active agents for various purposes, such as coating aids, prevention of antistatic properties, improvement of sliding properties, emulsifying dispersion, prevention of adhesion, and improvement of other photographic characteristics (e.g., development acceleration, increase in contrast, sensitization, and so on).

Examples of surface active agents which can be employed include nonionic surface active agents such as saponin (steroid type), alkylene oxide derivatives (e.g., polyethylene glycol, polyethylene glycol/polypropylene glycol condensates, polyethylene glycol alkyl ethers or polyethylene glycol alkyl aryl ethers, polyethylene glycol esters, polyethylene glycol sorbitane esters, polyalkylene glycol alkylamines or amides, polyethylene oxide adducts of silicone, etc.), glycidol derivatives (e.g., alkenylsuccinic acid polyglycerides, alkylphenol polyglycerides, etc.), fatty acid esters of polyhydric alcohols, alkyl esters of sugar, and so on; anionic surface active agents containing acid groups (e.g., a carboxyl group, a sulfo group, a phospho group, a sulfate group, a phosphate group, etc.), such as alkylcarboxylates, alkylsulfonates, alkylbenzenesulfonates, alkylnaphthalenesulfonates, alkylsulfates, alkylphosphates, N-acyl-N-alkyltaurines, sulfosuccinates, sulfoalkylpolyoxyethylene alkyl phenyl ethers, polyoxyethylene alkylphosphates, etc.; amphoteric surface active agents such as amino acids, aminoalkylsulfonates, aminoalkylsulfates, aminoalkylphosphates, alkylbetaines, amine oxides, etc.; cationic surface active agents such as alkylamines, aliphatic or aromatic quaternary ammonium salts, heterocyclic quaternary ammonium salts such as pyridinium, imidazolium and so on, aliphatic or hetero ring-containing phosphonium or sulfonium salts, and so on; and fluorine-containing surface active agents as described in Japanese Patent Publication No. 44411/81, etc.

For the purpose of increasing sensitivity and contrast, or accelerating the developing rate, photographic emulsion layers of the photographic light-sensitive material comprising the emulsion of the present ivention may contain, for example, polyalkylene oxides and derivatives thereof, such as ethers, esters and amines thereof, thioether compounds, thiomorpholines, quaternary ammonium salt compounds, urethane derivatives, urea derivatives, imidazole derivatives, 3-pyrazolidones, and so on.

The photographic light-sensitive material prepared in accordance with the present invention may contain, in its hydrophilic colloidal layers, water-soluble dyes as filter dyes or for various purposes such as prevention of irradiation. Examples of dyes useful for the above-described purposes include oxonol dyes, hemioxonol dyes, styryl dyes, merocyanine dyes, cyanine dyes, and azo dyes. Of these dyes, oxonol dyes, hemioxonol dyes, and merocyanine dyes are more advantageous.

The photographic emulsion layers and other hydrophilic colloidal layers of the light-sensitive material produced in accordance with the present invention may further comprise a brightening agent of a stilbene type, a triazine type, an oxazole type, a coumarin type, or so on. These brightening agents may be either soluble in water or insoluble therein. Water-insoluble brightening agents can be used in the form of a dispersion.

Photographic emulsion layers and other hydrophilic colloidal layers to be employed in accordance with the present invention can contain dispersions of water insoluble or sparingly water-soluble synthetic polymers for the purpose of improvement in dimensional stability and so on. Suitable examples of such polymers include those containing as constituent monomers an alkyl(meth)acrylate monomer, an alkoxyalkyl(meth)acrylate monomer, a glycidyl(meth)acrylate monomer, a (meth)acrylamide monomer, a vinyl ester monomer (e.g., vinyl acetate), an acrylonitrile monomer, an olefin monomer, a styrene monomer and so on. These polymers may be present individually or in combination of two or more thereof, or in combination of one or more of the above-described monomers with acrylic acid, methacrylic acid, an $\alpha,\beta$-unsaturated dicarboxylic acid, a hydroxyalkyl(metha)acrylate, a sulfoalkyl(metha)acrylate, a styrenesulfonic acid, or so on.

A photographic light-sensitive material comprising the emulsion of the present invention may also contain color image-forming couplers, i.e., compounds capable of forming colors by coupling with the oxidation product of an aromatic primary amine developing agent (e.g., phenylenediamine derivatives, aminophenol derivatives, etc.) upon color development processing. It is desirable for these couplers to be rendered diffusion resistant by containing a hydrophobic group as a so-called ballast group, or by comprising a polymeric form. These couplers may be either two-equivalent or four-equivalent to silver ion. In addition, colored couplers which have a color correcting effect, couplers capable of releasing development inhibitors upon development so-called DIR couplers), couplers capable of releasing development accelerators or fogging agents upon development (so-called DAR couplers and FR couplers, respectively), and so on may be incorporated in the light-sensitive material embodying the present invention. Further, colorless DIR coupling compounds which form colorless products upon a coupling reaction and release development inhibitors can also be incorporated.

Specific examples of magenta couplers which can be used include 5-pyrazolone couplers, pyrazolobenzimidazole couplers, cyanoacetylcumarone couplers, open-chain acylacetonitrile couplers, pyrazoloazole couplers and so on. Specific examples of yellow couplers which can be used include acylacetoamide couplers (e.g., benzoylacetoanilides, pivaloylacetoanilides, etc.), and so on. Specific examples of cyan couplers which can be used include naphthol couplers, phenol couplers, and so on.

Two or more of the above-described couplers can be incorporated together in the same layer in order to impart desired photographic characteristics to the light-sensitive material, and one coupler may also be incorporated in two or more different layers.

Introduction of these couplers into the silver halide emulsion layers is carried out using known methods, for example, the method described in U.S. Pat. No. 2,322,027, and so on.

Besides the above-described compounds, further compounds which can be used in the silver halide emulsion of the present invention, and in photographic light-sensitive materials using this emulsion include desensitizers, high boiling point organic solvents (coupler solvents), dye image stabilizers, stain inhibitors, absorbents (light absorbents and UV absorbents), plasticizers, lubricants, antistatic agents, matting agents, development accelerators, and so on. Specific examples of the foregoing additives which can be used herein are described in *Research Disclosure*, Volume 176, No. 17643, Sections I–XVI, pages 22–28 (Dec. 1978).

The finished emulsion is coated on an appropriate support, for example, baryta paper, resin-coated paper, synthetic paper, triacetate film, polyethylene terephthalate film, other plastic bases, or a glass plate. Suitable examples of coating techniques which can be employed include the dip coat method, the air knife coat method, the curtain coat method, an extrusion coat method using a hopper as described in U.S. Pat. No. 2,681,294, and various other techniques.

A support can be selected from transparent materials or opaque materials depending on the ultimate purpose for which the light-sensitive material is to be used. Where a transparent support is to be employed, it may be colorless, or it can be colored by addition of dyes or pigments while at the same time retaining its transparency.

The exposure required to obtain a photographic image may be carried out in a conventional manner. Any various known light sources, including infrared light sources, for example, natural light (sunlight), a tungsten lamp, a fluorescent lamp, a mercury lamp, a xenon arc lamp, a carbon arc lamp, a xenon flash lamp, cathode-ray tube flying spot, a light-emitting diode, laser beams (e.g., a gas laser, a YAG laser, a dye laser, a semiconductor laser, etc.), and so on can be employed for exposure. In addition, light emitted from phosphors excited by electron beams, X-ray, $\gamma$-ray, $\alpha$-ray or so on may be employed for exposure. Suitable exposure times which can be used include not only exposure times used commonly in cameras ranging from about $1 \times 10^{-3}$ to about 1 second, but also exposure times shorter than $1 \times 10^{-3}$ second, for example, about $1 \times 10^{-4}$ to about $1 \times 10^{-9}$ second as used with xenon flash lamps and cathode-ray tubes, and about $10^{-4}$ to about $10^{-12}$ second as used with laser beams. Exposure times longer than 1 second can also be used. The spectral composition of the light employed for the exposure can be controlled according to the objectives of the skilled artisan using color filters, if desired.

Photographic light-sensitive materials wherein the photographic emulsion of the present invention can be employed include various kinds of color photographic materials and black-and-white photographic materials.

For example, the photographic emulsion of the present invention can be employed in color negative films for photographing (for amateur photography use, motion picture use, etc.), color reversal films (for slide use, motion picture use, etc., which may or may not contain couplers), color photographic printing paper, color positive films (for motion picture use), color reversal photographic printing paper, heat-developable color photosensitive materials, color light-sensitive materials utilizing a silver dye bleach process, photographic light-sensitive materials for photomechanical use (e.g., lithographic films, scanner films, etc.), photographic light-sensitive materials for X-ray recording (e.g., for medical X-ray photography and photofluorography, for individual use, etc.), black-and-white negative films for picture-taking use, black-and-white photographic printing paper, photographic materials for microphotography (for COM use, microfilms, etc.), photographic materials for a color diffusion transfer process (DTR), photographic materials for a silver salt diffusion transfer process, printing-out photographic materials, and so on.

The photographic processing for the light-sensitive material produced in accordance with the present invention can be effected using any known processing method. Any known processing solution can be employed in the present invention. The processing temperature is generally in the range of about 18° C. to about 50° C. Of course, temperatures higher than 50° C. or lower than 18° C. may be employed. This photographic processing may be either a type of photographic processing for forming a silver image (black-and-white photographic processing) or a color photographic process comprising development-processing to form a dye image, if desired.

For details of this development-processing for color photographic materials, the descriptions in *Research Disclosure*, Vol. 176, No. 17643, pp. 28–29, ibid., and *Research Disclosure*, Vol. 187, No. 18816, p. 651, left and right columns, can be referred to.

The present invention is illustrated in greater detail by references to the following examples. However, the invention should not be construed as being limited to these examples. Unless otherwise indicated, all part, percents, ratios and the like are by weight.

EXAMPLE 1

A sulfur sensitized silver halide emulsion in which the halide composition of the silver halide was 70 mol% of chloride, 29.5% of bromide and 0.5 mol% of iodide was prepared. The mean diameter of the silver halide grains contained in the emulsion was 0.35 μm. A 1 kg portion of this emulsion contained 1.03 mole of silver halide.

One kilogram portions of this emulsion were weighed out in separate pots, and to each was added one of the compounds according to the present invention (Compound (30) or (37)) or a dye (A) or (B) employed for comparison, as shown in Tables 1 and 2. Stirring was carried out at 40° C. for homogeneous mixing. To each mixture, 4-hydroxy-6-methyl-1,3,3a,7-tetrazaindene, sodium 1-hydroxy-3,5-dichlorotriazine, and sodium dodecylbenzenesulfonate were successively added in amounts of 0.2 g, 0.1 g and 0.1 g, respectively, per 1 kg portion of the emulsion. The resulting emulsion was then coated on a polyethylene terephthalate film support to prepare a photographic light-sensitive material. One piece of each of the thus-obtained samples exposed to the light of a tungsten lamp (5400° K.) for 5 seconds through a yellow filter SC-46, produced by Fuji Photo Film Co., Ltd. (a filter by which light comprising wavelengths longer than 460 nm can be transmitted).

Another piece of each of the thus-obtained samples by means of a grating spectograph in order to take a spectrogram thereof.

After the exposure, the samples were developed at 20° C. for 2 minutes using a developer having the following composition. The density measurements were carried out using a densitometer manufactured by Fuji Photo Film Co., Ltd. to obtain yellow filter sensitivity (Sy) and fog values for each sample. The standard point of the optical density to determine the sensitivity was fog +1.5.

| Composition of Developer: | |
|---|---|
| Water | 700 ml |
| Metol | 3.1 g |
| Anhydrous Sodium Sulfite | 45 g |
| Hydroquinone | 12 g |
| Sodium Carbonate (monohydrate) | 79 g |
| Potassium Bromide | 1.9 g |
| Water to make | 1 liter |

In using this developer, two volumes of water were added thereto.

The results obtained are shown in Table 1 and Table 2 as relative values.

TABLE 1

| Test No. | Compound and Amount used ($\times 10^{-4}$ mol/Kg emulsion) | | Sy | Fog | Remarks | Spectrogram |
|---|---|---|---|---|---|---|
| 1 | — | — | — | 0.05 | | |
| 2 | (A) | 3.3 | 100 | 0.05 | Comparison | |
| 3 | (A) | 6.6 | 120 | 0.05 | Comparison | |
| 4 | (A) | 13.2 | 95 | 0.06 | Comparison | |
| 5 | (30) | 3.3 | 138 | 0.05 | Invention | FIG. 1 |
| 6 | (30) | 6.6 | 148 | 0.05 | Invention | |
| 7 | (30) | 13.2 | 107 | 0.06 | Invention | |

TABLE 2

Figure 2:
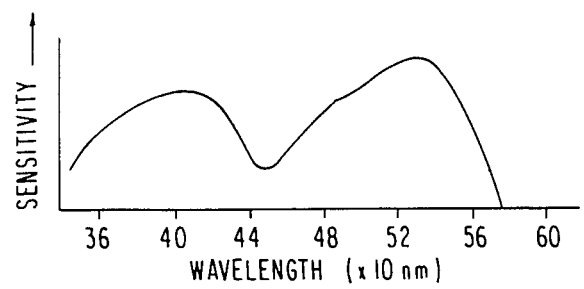

| Test No. | Compound and Amount used ($\times 10^{-4}$ mol/Kg emulsion) | | Sy | Fog | Remarks | Spectrogram |
|---|---|---|---|---|---|---|
| 8 | — | — | — | 0.05 | | |
| 9 | (B) | 1.65 | 100 | 0.05 | Comparison | |
| 10 | (B) | 3.3 | 112 | 0.05 | Comparison | |
| 11 | (B) | 6.6 | 76 | 0.05 | Comparison | |
| 12 | (37) | 1.65 | 73 | 0.05 | Invention | FIG. 2 |
| 13 | (37) | 3.3 | 159 | 0.05 | Invention | |
| 14 | (37) | 6.6 | 100 | 0.05 | Invention | |

Chemical Structure of Dyes used for Comparison

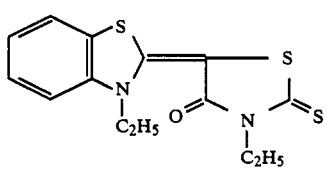

(A)

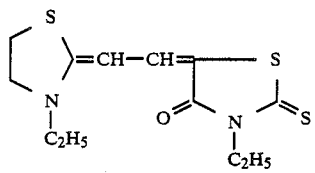
(B)

As can be seen from the data shown in Table 1 and Table 2, and the spectrograms shown in the figures 1 and 2, use the compounds represented by general formula (I) in a silver halide emulsion of the present invention results in superior sensitizing characteristics.

EXAMPLE 2

Silver halide grains were formed using a single jet process, physically ripened in a conventional manner, subjected to a desalting processing, and further ripened chemically. Thus, a silver iodobromide emulsion (iodide content: 8 mol%) was obtained. The mean grain size of the silver halide grains contained in this emulsion was 0.8 micron. A 1 Kg portion of this emulsion contained 0.55 mole of silver halide. One kilogram portions of this emulsion were weighed out in separate pots, and melted in a bath maintained at 50° C. Methanol solutions containing the sensitizing dye according to the present invention in the amounts set forth in Table 3 were added to each portion, respectively, and mixed at a temperature of 40° C. with stirring.

Further, 4-hydroxy-6-methyl-1,3,3a,7-tetrazaindene, sodium 2-hydroxy-4,6-dichlorotriazine, and sodium dodecylbenzenesulfonate were successively added in an amount of 0.1 g each per 1 kg portion of the emulsion, and stirred. These finished emulsions were then coated on separate cellulose triacetate film supports to prepare photographic light-sensitive materials.

One sample piece of each light-sensitive material was exposed for 1/20 second by means of a sensitometer equipped with a light source having a color temperature of 5,400° K. and a yellow filter SC-50, produced by Fuji Photo Film Co., Ltd. (a filter by which light of wavelengths longer than 500 nm can be transmitted).

Another sample piece of each light-sensitive material was exposed by means of a grating spectrograph in order to take a spectrogram thereof.

The sample pieces were thereafter developed at 20° C. for 7 minutes using a developer having the following composition.

The density measurements were carried out using a densitometer manufactured by Fuji Photo Film Co., Ltd. to obtain yellow filter sensitivity (Sy) and fog values for each sample. The standard point of the optical density to determine the sensitivity was fog +0.2.

| Composition of Developer: | |
| --- | --- |
| Water | 300 ml |
| Metol | 2 g |
| Anhydrous Sodium Sulfite | 100 g |
| Hydroquinone | 5 g |
| Borax (pentahydrate) | 1.5 g |
| Water to make | 1 liter |

The results obtained are shown in Table 3 as relative values.

TABLE 3

Figure 3:
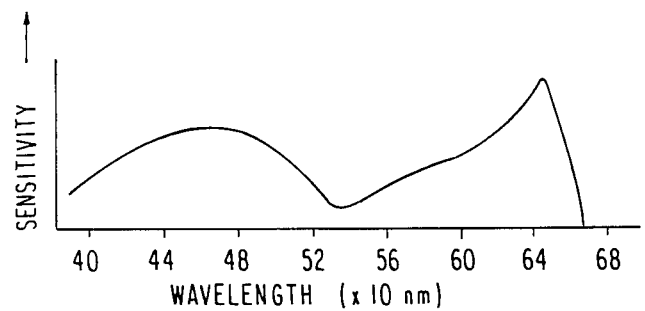

| Test No. | Compound and Amount used ($\times 10^{-5}$ mol/kg emulsion) | | Sy | Fog | Spectrogram |
| --- | --- | --- | --- | --- | --- |
| 15 | — | | 100 | 0.05 | |
| 16 | (20) | 4.2 | 309 | 0.05 | |
| 17 | (20) | 8.4 | 354 | 0.05 | FIG. 3 |
| 18 | (20) | 16.8 | 500 | 0.06 | |
| 19 | (20) | 33.6 | 490 | 0.07 | |

As can be seen from the data in Table 3 and the spectrogram shown in FIG. 3, the use of the compounds represented by general formula (I) in a silver halide emulsion of the present invention resulted in excellent spectral sensitizability.

EXAMPLE 3

Photographic light-sensitive materials were prepared using the same amount of the same silver halide emulsion and the same amount of the same additives (4-hydroxy-6-methyl-1,3,3a,7-tetrazaindene, sodium 1-hydroxy-3,5-di-chlorotriazine, and sodium dodecylbenzenesulfonate) as employed in Example 1, but further adding thereto the respective compounds described below.

Test No. 20: No further compounds were added. Test No. 21: Compound (30) according to the present invention was added in an amount of $3.3 \times 10^{-4}$ mole per 1 Kg portion of the emulsion. Test No. 22: Dye (C) for comparison and Development Accelerator (D) were added in an equal amount of $3.3 \times 10^{-4}$ mole per 1 Kg portion of the emulsion.

Each sample was exposed to the light of a tungsten lamp (5,400° K.) for 5 seconds through a blue filter which can only transmit light in the intrinsic sensitivity region of silver halides (Wratten filter-36, a product of Eastman Kodak Co.). The development was carried out at 20° L C. using a developer having the same composition as the developer used in Example 1. The developing step varied from 20 seconds to 8 minutes, as shown in Table 4. The density measurements of the development-processed samples were carried out using a densitometer manufactured by Fuji Photo Film Co., Ltd. to obtain their individual blue filter sensitivity (Sb) and fog values. The standard point of the optical density to determine the sensitivity was fog +1.5. The results obtained are shown in Table 4 as relative values.

Chemical Structure of Dye used for Comparison

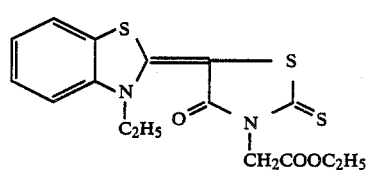
(C)

Chemical Structure of Development Accelerator used for Comparison

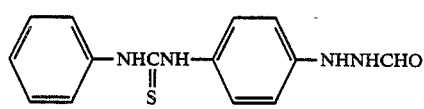
(D)

TABLE 4

| Developing Time | | Test No. 20 (Comparison) | | Test No. 21 (Invention) | | Test No. 22 (Comparison) | |
|---|---|---|---|---|---|---|---|
| | | Sb | Fog | Sb | Fog | Sb | Fog |
| | 20 sec. | 100 | 0.04 | 100 | 0.04 | 100 | 0.12 |
| | 40 sec. | 166 | 0.04 | 162 | 0.04 | 145 | 0.22 |
| 1 min. | | 209 | 0.04 | 234 | 0.04 | 195 | 0.31 |
| 1 min. | 30 sec. | 269 | 0.04 | 347 | 0.04 | 229 | 0.44 |
| 2 min. | | 282 | 0.05 | 537 | 0.05 | 246 | 0.58 |
| 2 min. | 30 sec. | 288 | 0.05 | 645 | 0.06 | 251 | 0.68 |
| 3 min. | | 316 | 0.05 | 870 | 0.07 | 269 | 0.74 |
| 4 min. | | 347 | 0.05 | 1070 | 0.13 | 302 | 0.96 |
| 6 min. | | 398 | 0.07 | 1170 | 0.27 | 354 | 1.40 |
| 8 min. | | 437 | 0.08 | 1230 | 0.77 | 372 | 2.06 |

The sensitivities (Sb) of each photographic material are shown as relative values, with the sample developed for 20 seconds being assigned a value of 100.

As can be seen from the results shown in Table 4, development proceeded more rapidly in the photographic materials containing the compound of the present invention than in the samples of Test No. 20 which did not contain compounds represented by general formula (I). For instance, in order to achieve the sensitivity 3.47 times that obtained by 20 seconds' development, Test No. 20 takes 4 minutes' development, but on the other hand, Test No. 21 according to the present invention takes 1.5 minutes' development. Such a development accelerating effect as described above was not produced by the combined use of the development accelerator and the dye (Test No. 22), and further, a marked increase in fog is shown in Test No. 22 using comparative Dye (C) and comparative Development Accelerator (D).

While the invention has been described in detail and with reference to specific embodiments thereof, it will be apparent to one skilled in the art that various changes and modifications can be made therein without departing from the spirit and scope thereof.

What is claimed is:

1. A silver halide photographic emulsion comprising at least one compound represented by the following general formula (I):

$$\text{Dye}-J^1-\text{CONH}-J^2-\text{NHNHG}-R \quad (I)$$

wherein Dye represents a dye residue capable of becoming a spectral sensitizing dye; $J^1$ represents a substituted or unsubstituted alkylene group, a substituted or unsubstituted arylene group, a substituted or unsubstituted aralkylene group, or a substituted or unsubstituted alkarylene group; $J^2$ represents a substituted or unsubstituted arylene group; R represents a hydrogen atom, a substituted or unsubstituted alkyl group, a substituted or unsubstituted aryl group, a substituted or unsubstituted alkoxy group, or a substituted or unsubstituted aryloxy group; and G represents a carbonyl group, a sulfonyl group, a sulfoxy group, a phosphoryl group, or a substituted or unsubstituted iminomethylene group.

2. A silver halide photographic emulsion as claimed in claim 1, wherein said dye residue represented by Dye is selected from the group consisting of cyanine dyes and merocyanine dyes.

3. A silver halide photographic emulsion as claimed in claim 1, wherein said dye residue represented by Dye is selected from the group consisting of complex cyanine dyes, complex merocyanine dyes, holopolar cyanine dyes, hemicyanine dyes, styryl dues and hemioxonol dyes.

4. A silver halide photographic emulsion as claimed in claim 1, wherein said compound represented by general formula (I) is present in an amount from about $1 \times 10^{-6}$ to about $5 \times 10^{-3}$ mole per mole of silver halide.

5. A silver halide photographic emulsion as claimed in claim 4, wherein said compound represented by general formula (I) is present in an amount from $1 \times 10^{-5}$ to $2.5 \times 10^{-3}$ mole per mole of silver halide.

6. A silver halide photographic emulsion as claimed in claim 5, wherein said compound represented by general formula (I) is present in an amount from $4 \times 10^{-5}$ to $1 \times 10^{-3}$ mole per mole of silver halide.

* * * * *